(12) United States Patent
Anzai et al.

(10) Patent No.: US 12,455,947 B2
(45) Date of Patent: Oct. 28, 2025

(54) VEHICLE CONTROL SYSTEM AND VEHICLE CONTROL METHOD

(71) Applicant: Panasonic Intellectual Property Management Co., Ltd., Osaka (JP)

(72) Inventors: Jun Anzai, Kanagawa (JP); Toshihisa Nakano, Osaka (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 204 days.

(21) Appl. No.: 18/228,833

(22) Filed: Aug. 1, 2023

(65) Prior Publication Data
US 2023/0376575 A1 Nov. 23, 2023

Related U.S. Application Data

(63) Continuation of application No. PCT/JP2021/045967, filed on Dec. 14, 2021.

(30) Foreign Application Priority Data

Feb. 12, 2021 (JP) .................................. 2021-021005

(51) Int. Cl.
*G06F 21/52* (2013.01)
*G06F 21/12* (2013.01)
(Continued)

(52) U.S. Cl.
CPC ............ *G06F 21/121* (2013.01); *G06F 21/52* (2013.01); *G06F 21/70* (2013.01)

(58) Field of Classification Search
CPC ........ G06F 21/12; G06F 21/121; G06F 21/50; G06F 21/52; G06F 21/70; G06F 21/53; G06F 21/62

See application file for complete search history.

(56) References Cited

U.S. PATENT DOCUMENTS

2002/0174369 A1 11/2002 Miyazaki et al.
2003/0079123 A1* 4/2003 Mas Ribes .............. G06F 21/53
713/156
(Continued)

FOREIGN PATENT DOCUMENTS

JP 2002-318719 10/2002
JP 2002318719 A * 10/2002 ......... G06F 21/6218
(Continued)

OTHER PUBLICATIONS

Office Action from Japan Patent Office (JPO) in Japanese Patent Appl. No. 2022-581209, dated Sep. 10, 2024, together with an English language translation.
(Continued)

*Primary Examiner* — Jayesh M Jhaveri
(74) *Attorney, Agent, or Firm* — Greenblum & Bernstein, P.L.C.

(57) ABSTRACT

An integrated ECU is a vehicle control system provided in a vehicle, and includes: an application executor that executes an application program; an environment state determiner that determines whether the application executor is anomalous; a first resource provider that provides a resource to be used for controlling the vehicle; and a first access controller that, upon acceptance of a request for the resource from the application program, (a) prohibits provision of the resource from the resource provider to the application program, when the environment state determiner determines that the application executor is anomalous, and (b) permits the provision of the resource from the resource provider to the application program, when the environment state determiner determines that the application executor is not anomalous.

8 Claims, 6 Drawing Sheets

(51) Int. Cl.
    *G06F 21/53*     (2013.01)
    *G06F 21/62*     (2013.01)
    *G06F 21/70*     (2013.01)

(56) References Cited

U.S. PATENT DOCUMENTS

2014/0090019 A1    3/2014  Ohmata et al.
2014/0208414 A1    7/2014  Brandwine et al.
2020/0003832 A1*   1/2020  Nishimura ....... G01R 31/31718
2021/0347331 A1*  11/2021  Hiruta ................... B60R 25/241

FOREIGN PATENT DOCUMENTS

| JP | 2012-118842 | 6/2012 | |
|----|-------------|--------|--|
| JP | 5961164 | 8/2016 | |
| JP | 6306055 | 4/2018 | |
| JP | 6417799 | 11/2018 | |
| JP | 2020-004070 | 1/2020 | |
| JP | 2020004070 A * | 1/2020 | ......... G01R 31/2894 |
| WO | 2014/116748 | 7/2014 | |

OTHER PUBLICATIONS

International Search Report (ISR) from International Searching Authority (Japan Patent Office) in International Pat. Appl. No. PCT/JP2021/045967, dated Mar. 15, 2022, together with an English language translation.

* cited by examiner

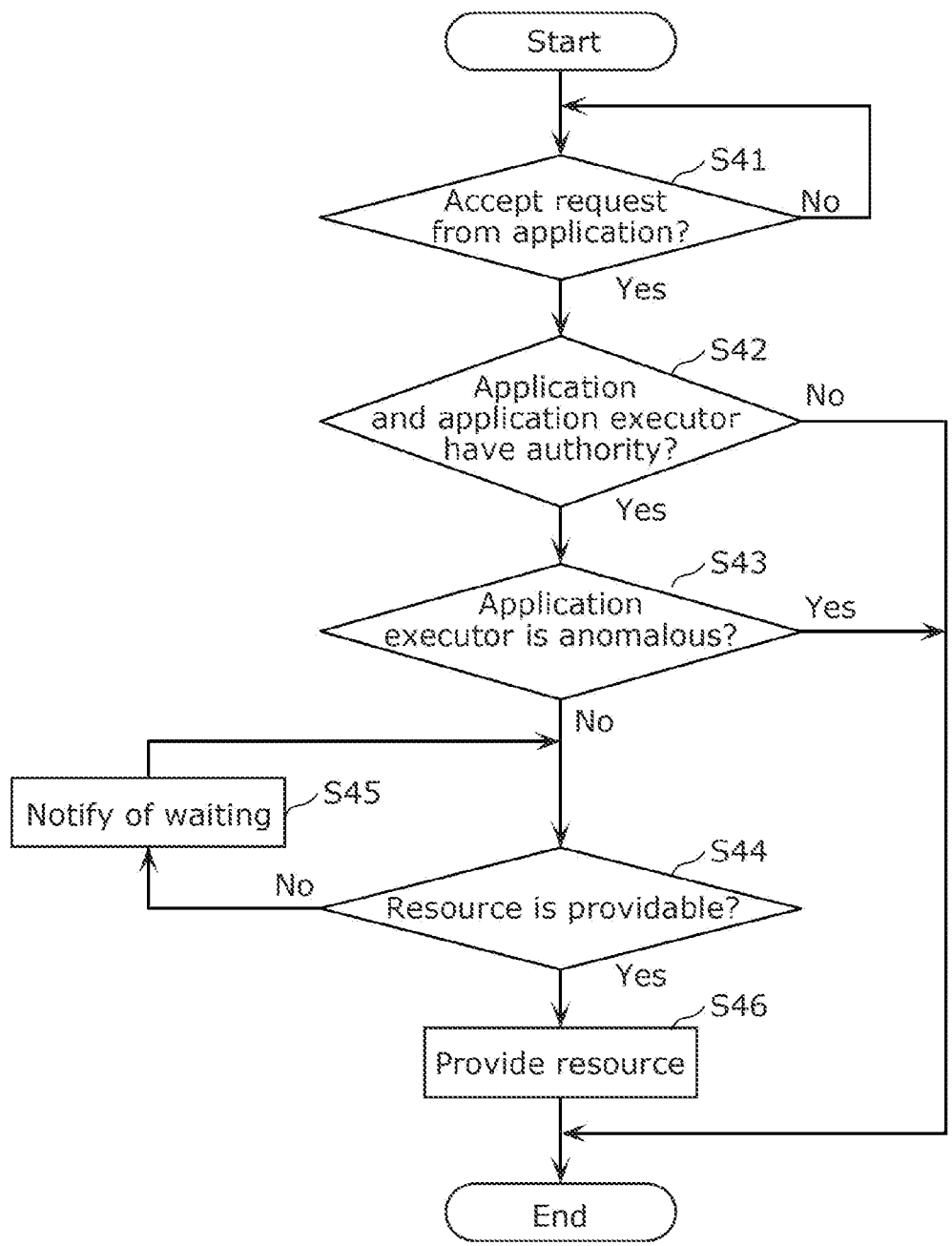

VEHICLE CONTROL SYSTEM AND VEHICLE CONTROL METHOD

CROSS REFERENCE TO RELATED APPLICATIONS

This is a continuation application of PCT International Application No. PCT/JP2021/045967 filed on Dec. 14, 2021, designating the United States of America, which is based on and claims priority of Japanese Patent Application No. 2021-021005 filed on Feb. 12, 2021.

FIELD

The present disclosure relates to a vehicle control system, and the like, for controlling a vehicle.

BACKGROUND

Conventionally, a device or a program has been proposed which prohibits an application program (hereinafter, also referred to as an application) from accessing a resource without restriction (see Patent Literature (PTL) 1, for example).

This device acquires an application via a network and verifies whether a signature of the acquired application is valid. If the signature is valid, the device determines that the application is application A. Application A is created based on certain rules. The device prohibits the application from accessing a predetermined resource based on a result of the determination for the application.

CITATION LIST

Patent Literature

PTL 1: Japanese Patent No. 5961164

SUMMARY

However, the device according to PTL 1 can be improved upon.

In view of this, the present disclosure provides a vehicle control system and the like, which are capable of improving upon the above related art.

A vehicle control system according to an aspect of the present disclosure includes: an application executor that executes an application program; an environment state determiner that determines whether the application executor is anomalous; a resource provider that provides a resource to be used for controlling the vehicle; and a first access controller that, upon acceptance of a request for the resource from the application program, (a) prohibits provision of the resource from the resource provider to the application program, when the environment state determiner determines that the application executor is anomalous, and (b) permits the provision of the resource from the resource provider to the application program, when the environment state determiner determines that the application executor is not anomalous.

These comprehensive or specific embodiments may be embodied by a system, a method, an integrated circuit, a computer program, or a recording medium including a computer readable CD-ROM, and may be embodied by any combination among the system, the method, the integrated circuit, the computer program, or the recording medium.

Further improvements can be made to a vehicle control system according to the present disclosure.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 6 is a flowchart showing a processing operation of the first resource provider according to the embodiment.

Figure 1:
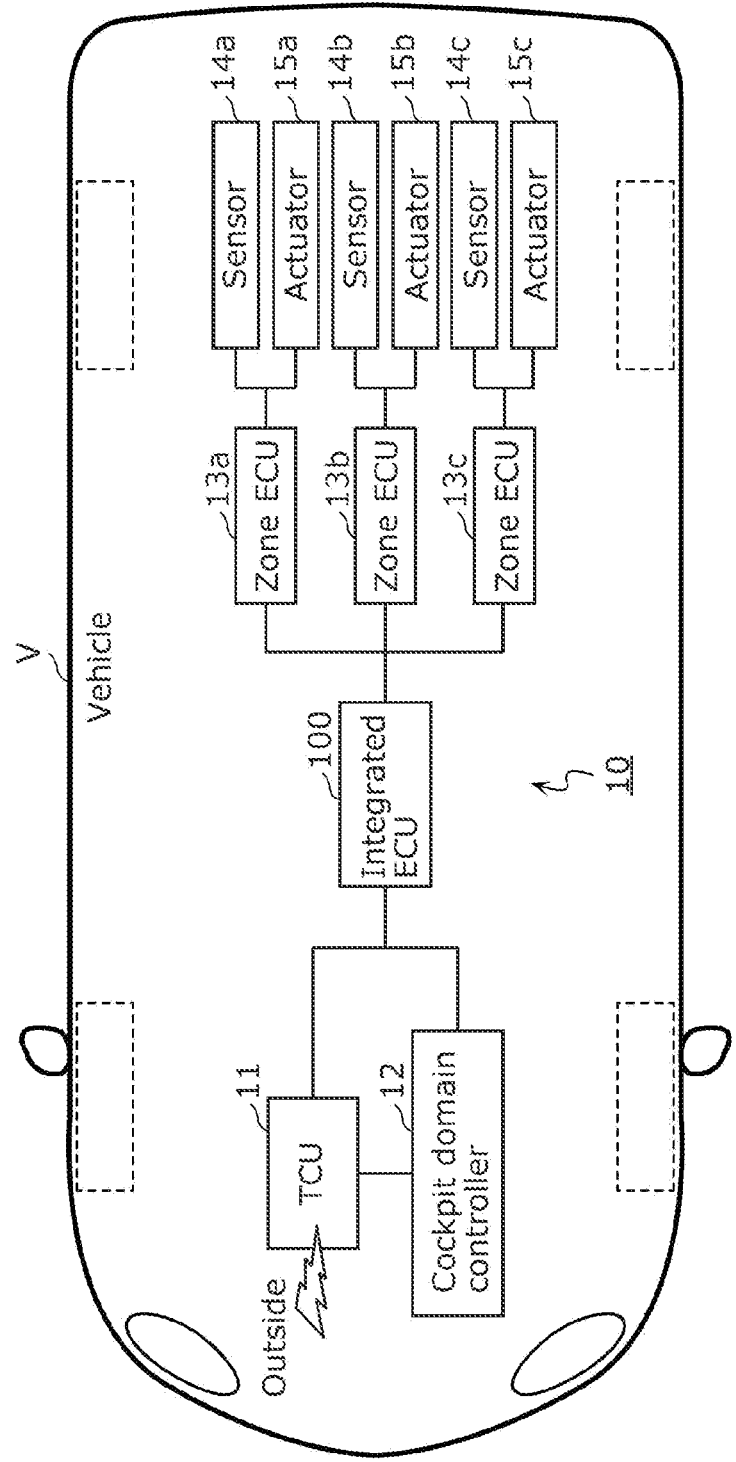
FIG. 1 is a diagram showing a configuration example of an onboard system according to an embodiment.

DESCRIPTION OF EMBODIMENTS (Underlying Knowledge Forming Basis of the Present Disclosure)

Currently, mobility services such as mobility as a service (MaaS) have been proposed. For vehicles used in the mobility service (i.e., connected cars), many functions are required to achieve data security, safety, seamless services, software or hardware updates, efficiency, comfortability, and the like. In order to equip a vehicle with these many functions, an integrated ECU that integrates all or part of multiple ECUs is used among many ECUs so as to simplify a system in the vehicle, rather than distributing those many ECUs in a vehicle.

The integrated ECU has at least an environment for executing an application program (also referred to as a third party application) of a business provider who provides mobility services, and a function relating to control of a vehicle, which is necessary for providing the mobility services. The functions relating to the control of a vehicle include a function of driving a vehicle to a destination, a function of opening and closing a trunk of a vehicle, and a function of opening and closing windows of a vehicle, for example.

In the device of PTL 1, a type of an application program is determined based on a signature of the application program, and access to a resource from the application program is controlled based on a result of the determination of the type. Such control may be applied to the integrated ECU. Even in such a situation, there is a possibility that a vehicle may be controlled inappropriately, if an environment in which the application program is executed is compromised by an attack from the outside.

In order to solve the above case, a vehicle control system according to an aspect of the present disclosure is a vehicle control system provided in a vehicle, the vehicle control system including: an application executor that executes an application program; an environment state determiner that determines whether the application executor is anomalous; a resource provider that provides a resource to be used for controlling the vehicle; and a first access controller that, upon acceptance of a request for the resource from the application program, (a) prohibits provision of the resource from the resource provider to the application program, when the environment state determiner determines that the application executor is anomalous, and (b) permits the provision of the resource from the resource provider to the application program, when the environment state determiner determines that the application executor is not anomalous. The resource provider may include the first access controller, for example. In addition, the resource may be at least one of information, a function, and a hardware resource, which are used for controlling the vehicle, for example.

With this configuration, when it is determined that the application executor that is an execution environment for executing the application program is anomalous, the provision of the resource to the application program from the resource provider is prohibited. If an application executor has been attacked from the outside and compromised, for example, it is determined that application executor is anomalous. Accordingly, provision of the resources to an application program in such an application executor that has been compromised is prohibited. Therefore, a vehicle can be prevented from being inappropriately controlled by such an application program using such a resource. As a result, the vehicle can be appropriately controlled.

Furthermore, the application executor includes a second access controller. The second access controller may check authority of the application program, and may permit, hold, or prohibit the request for the resource from the application program, according to a result of the check of the authority.

With this configuration, when the application program does not have authority to use a resource to be used for controlling a vehicle, a request for the resource from the application program can be held or prohibited. As a result, it is possible to prevent a malicious third party who is not a car manufacturer, a car dealer, or a user of the vehicle from causing the vehicle control system to download the application program, and from inappropriately controlling the vehicle.

Furthermore, the second access controller: may notify the first access controller of the request for the resource from the application program, when the resource requested by the application program is not providable in the application executor; and may not notify the first access controller of the request for the resource from the application program, when the resource requested by the application program is providable in the application executor.

With this configuration, the request for the resource is notified to the first access controller, only when the resource cannot be provided in the application executor. Accordingly, it is possible to prevent the first access controller from being bothered of notification of the request for the resource even when the resource can be provided in the application executor. As a result, useless notification of the requests for the resources can be reduced to reduce processing load.

Furthermore, the vehicle control system may further include an authority determiner that determines whether the application program or the application executor has authority to use the resource. The first access controller may permit, upon the acceptance of the request for the resource from the application program, the provision of the resource from the resource provider to the application program, when the environment state determiner determines that the application executor is not anomalous and the authority determiner determines that the application program or the application executor has the authority.

With this configuration, when the application program or the application executor does not have an appropriate authority, the provision of the resource to the application program can be prohibited. As a result, it is possible to prevent a malicious third party from causing the vehicle control system to download the application program, and from inappropriately controlling the vehicle.

Furthermore, the vehicle control system may further include a resource state determiner that determines whether the resource is providable. The first access controller may permit, upon the acceptance of the request for the resource from the application program, the provision of the resource from the resource provider to the application program, when the environment state determiner determines that the application executor is not anomalous and the resource state determiner determines that the resource is providable.

With this configuration, the provision of a resource to the application program is permitted when the resource is providable. Accordingly, it is possible to prevent conflict in use of the resource, for example by permitting the provision of the resource when the resource is not providable. Alternatively, it is possible to prevent a vehicle from being controlled at inappropriate timing by the application program using the resource. For example, the resource may be a function of opening/closing a trunk or a door of a vehicle. In this situation, it is possible to prevent a trunk or a door from being opened due to the control by the application program using the resource at a timing during the vehicle running.

Furthermore, the vehicle control system may include a plurality of the resource providers each including the first access controller.

With this configuration, the provision of the resource to the application program can be appropriately managed, for each resource.

Furthermore, the first access controller may be included in a component that is less likely to be attacked than the application executor is, among components of the vehicle control system.

With this configuration, a possibility that the first access controller is attacked can be reduced, and the provision of a resource to an application program can be appropriately controlled.

Furthermore, the vehicle control system may further include a communication relay that relays communication between the application executor and the first access controller. The environment state determiner may be included in the communication relay.

With this configuration, if the communication relay is a hypervisor, the possibility that environment state determiner in the hypervisor is attacked can be reduced. Therefore, it is possible to appropriately determine whether the application executor is anomalous.

These comprehensive or specific embodiments may be embodied by a system, a method, an integrated circuit, a computer program, or a recording medium including a computer readable CD-ROM, and may be embodied by any combination among the system, the method, the integrated circuit, the computer program, and the recording medium.

Hereinafter, embodiments are specifically described, with reference to the drawings.

It should be noted that each of the embodiments described below indicates a comprehensive or a specific example. A numerical value, a shape, a material, a component, arrangement position of the component, connection form of the components, a step, an order of the steps, and the like, indicated in the embodiments below are examples, and are not intended to limit the present disclosure. Components that are not recited in independent claims reciting the highest idea among components described in the embodiments below will be described as optional components. Furthermore, each drawing is a schematic diagram, and thus is not strictly illustrated. Moreover, in each figure, the same symbol is allocated to the same structural component.

EMBODIMENTS

FIG. 1 is a diagram showing a configuration example of an onboard system according to an embodiment.

Onboard system 10 according to the present embodiment is a system mounted in vehicle V, and includes TCU 11, cockpit domain controller 12, integrated ECU 100, zone ECUs 13a to 13c, sensors 14a to 14c, and actuators 15a to 15c. It should be noted that these components may be connected via a communication path such as a controller area network (CAN) bus.

Telematics control unit (TCU) 11 is a communication module connectable to a communication network, such as the Internet. In other words, TCU 11 communicates with the outside. For example, TCU 11 downloads an application program, via its communication network, from a third party that is not a car manufacturer, a car dealer, or a user of vehicle V. It should be noted that the application program is also referred to as appli, application, or app. TCU 11 then outputs the application to integrated ECU 100.

Cockpit domain controller 12 integrates and controls, for example, an in-vehicle infotainment (IVI), a digital cluster, and a head-up display. The digital cluster is a unit panel that collects various meters necessary for driving.

Integrated electronic control unit (ECU) 100 controls zone ECUs 13a to 13c. In this embodiment, integrated ECU 100 is an example of a vehicle control system provided in vehicle V.

Zone ECU 13a controls actuator 15a according to a result of sensing by sensor 14a and an instruction from integrated ECU 100, thereby driving a mechanism in an area assigned to zone ECU 13a in vehicle V. This mechanism may be front or rear wheels of vehicle V and may be a mechanism for opening a window, a door, or a trunk.

Similarly, zone ECU 13b controls actuator 15b according to a result of the sensing by sensor 14b and an instruction from integrated ECU 100, thereby driving the mechanism in an area assigned to zone ECU 13b in vehicle V. This mechanism may be front or rear wheels of vehicle V and may be the mechanism for opening a window, a door or a trunk.

Similarly, zone ECU 13c controls actuator 15c according to a result of the sensing by sensor 14c and an instruction from integrated ECU 100, thereby driving the mechanism in an area assigned to zone ECU 13c in vehicle V. This mechanism may be front or rear wheels of vehicle V and may be the mechanism for opening a window, a door or a trunk.

Figure 2:
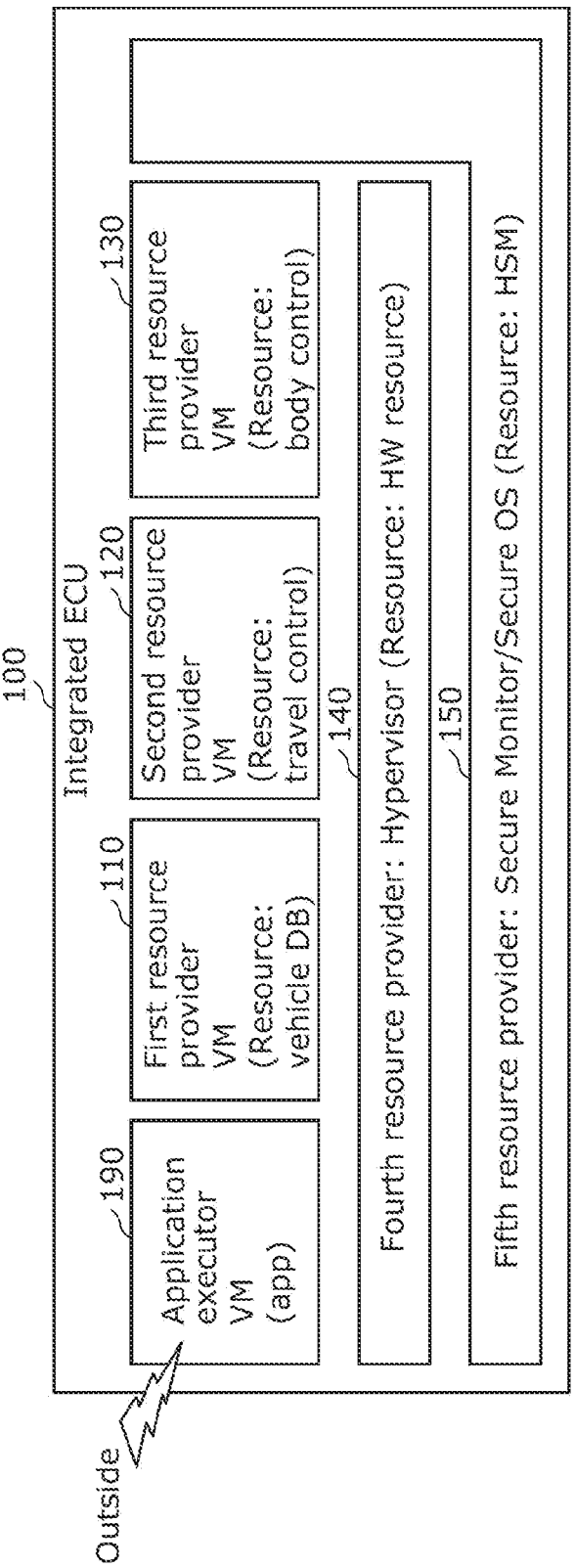
FIG. 2 is a block diagram showing an example of a functionality configuration of a vehicle control system that is an integrated electronic control unit (ECU) according to the embodiment.

FIG. 2 is a block diagram showing an example of a functionality configuration of a vehicle control system that is integrated ECU 100 according to the embodiment.

Integrated ECU 100 is configured as a system on a chip (SoC), and controls at least one of, for example, running of vehicle V, a body of vehicle V, and data used in vehicle V, as general control of vehicle V. Such integrated ECU 100 includes first resource provider 110, second resource provider 120, third resource provider 130, fourth resource provider 140, fifth resource provider 150, and application executor 190. It should be noted that these resource providers and application executor 190 each are embodied by execution of a software program by integrated ECU 100. Further, integrated ECU 100 may include one central processing unit (CPU), or may include a plurality of CPUs.

First resource provider 110, second resource provider 120, and third resource provider 130 are configured as virtual machines (also referred to as VMs) and control vehicle V.

First resource provider 110 uses a vehicle database as the resource to control a travel route of vehicle V, and the like, and further provides the vehicle database. It should be noted that the vehicle database is hereinafter also referred to as vehicle DB. First resource provider 110 may have the vehicle database. Further, the vehicle database may be personal information of a user of vehicle V, information indicating a history of driving operation of the user, or a travel history of vehicle V, for example.

Second resource provider 120 uses a travel control function as the resource of controlling a driving mechanism of vehicle V, and further provides the travel control function. The travel control function includes, for example, a function of making vehicle V travel, a function of stopping vehicle V, a function of making vehicle V turn left and right, and the like.

Third resource provider 130 uses a body control function of vehicle V as the resource of controlling a body of vehicle V, and further provides the body control function. The body control function includes, for example, a function of opening and closing windows, a trunk, or doors of vehicle V.

Fourth resource provider 140 is a hypervisor used for implementing a virtual machine and provides a hardware resource as the resource. The hardware resource is hereinafter also referred to as an HW resource. An example of the HW resource is a CPU resource or a memory resource, which may also be referred to as a processing resource.

Fifth resource provider 150 is a secure monitor or a secure operating system (OS), and uses a hardware security module (HSM) as the resource, to thereby control vehicle V. Furthermore, fifth resource provider 150 provides the HSM.

As described above, each resource provider in the present embodiment provides resources to be used for controlling vehicle V. Further, the resources according to the present embodiment are at least one of information, functions, and hardware resources to be used for controlling vehicle V.

Application executor 190 is configured as a virtual machine that executes applications downloaded via TCU 11. It should be noted that application executor 190 is an environment in which an application is installed and executed, and is also referred to as an application execution environment or an execution environment. For example, an application is executed by application executor 190 to cause a display in vehicle V to display an image or video, or cause a speaker in vehicle V to output sound, voice, or music.

Figure 3:
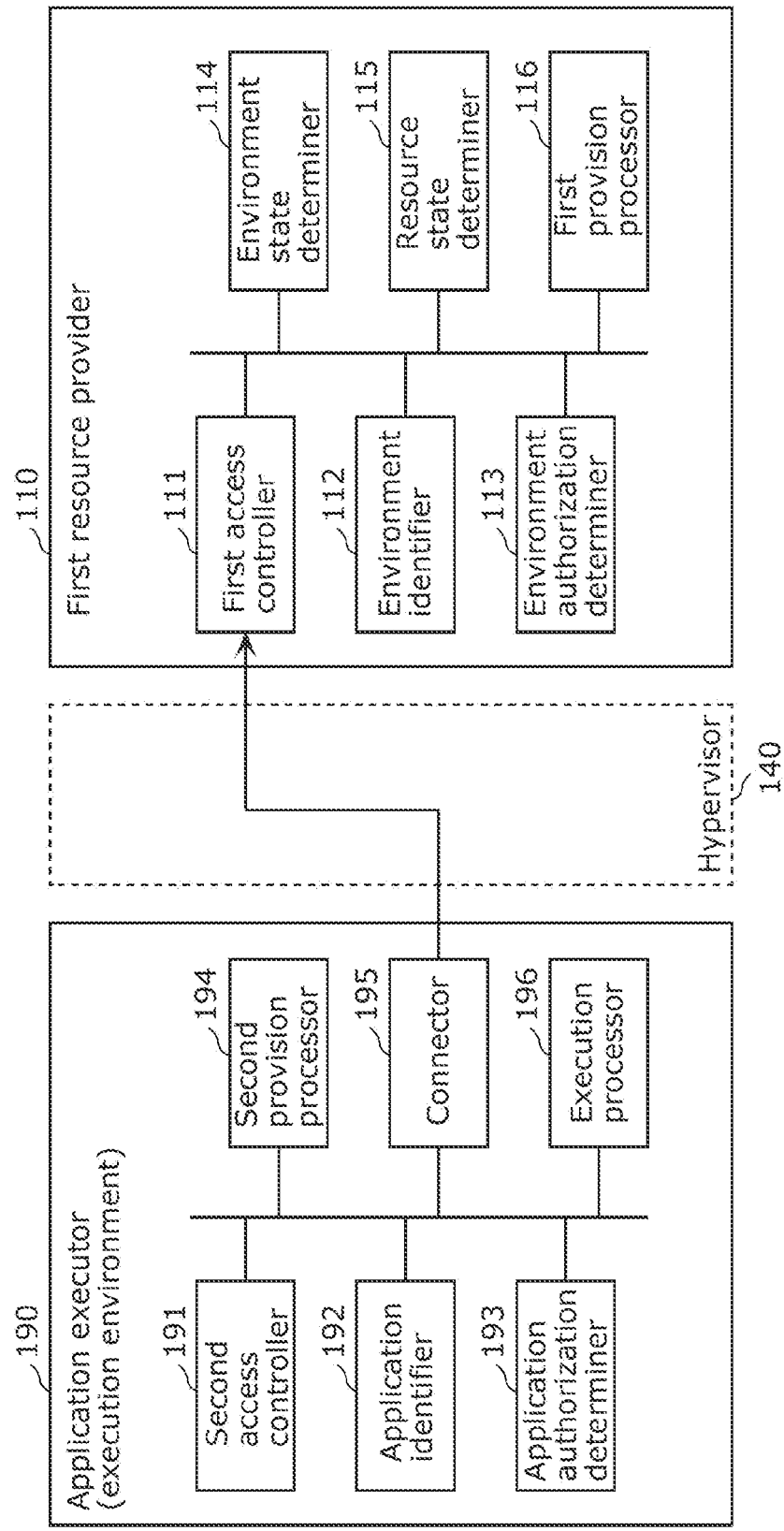
FIG. 3 is a block diagram showing an example of a functionality configuration of each of an application executor and a first resource provider, according to the embodiment.

FIG. 3 is a block diagram showing an example of a functionality configuration of each of application executor 190 and first resource provider 110.

Application executor 190 includes second access controller 191, application identifier 192, application authorization determiner 193, second provision processor 194, connecter 195, and execution processor 196.

Application identifier 192 identifies an application downloaded via TCU 11 and notifies application authorization determiner 193 of a result of the identification. For example, application identifier 192 extracts identification information of an application from the application so as to identify the application. Then, application identifier 192 outputs the identification information to application authorization determiner 193.

Based on a result of the identification of the application by application identifier 192, application authorization determiner 193 determines whether the application has authority. For example, application authorization determiner 193 refers to a data table showing identification information of each application, which is associated with authority, and checks authority associated with the identification information output from application identifier 192, in the data table. By the check, it is determined whether the application has the authority.

The authority includes, for example, execution authority, authority of using a resource in an environment, and authority of using a resource outside an environment. The execution authority is authority for an application to be executed in application executor 190. Further, the authority of using a resource in an environment is authority for an application to use resources inside the execution environment, which are resources providable inside application executor 190. Further, the authority of using a resource outside an environment is authority for an application to use resources outside the execution environment, which are resources providable outside application executor 190.

Execution processor 196 executes an application, when application authorization determiner 193 determines that the application has the execution authority.

Second provision processor 194 provides the application with the aforementioned resource inside the execution environment, in response to the control of second access controller 191. The resources inside the execution environment may be, for example, a function of displaying an image or video, or a function of outputting sound, voice, or music.

Second access controller 191 checks authority of the application based on the determination by application authorization determiner 193, so as to permit or prohibit a request for a resource by the application according to a result of the check for the authority. Specifically, second access controller 191 permits a request for a resource inside the execution environment by an application, when the application has the authority to use the resources inside the execution environment. At this time, second access controller 191 causes second provision processor 194 to provide the application with the resource inside the execution environment. In addition, second access controller 191 permits a request for a resource outside the execution environment by an application, when the application has authority to use the resources outside the execution environment. At this time, second access controller 191 notifies first access controller 111 of first resource provider 110 via connector 195, of the request for the resource outside the execution environment by the application. In other words, second access controller 191 notifies first access controller 111 of a request for a resource by the application, when the resource requested by the application program cannot be provided in application executor 190. On the other hand, second access controller 191 does not notify first access controller 111 of the request for a resource by the application, when the resource can be provided in application executor 190.

Connector 195 connects to first access controller 111 of first resource provider 110. For example, connector 195 connects to first access controller 111, when second access controller 191 permits a request for the resource outside the execution environment by the application. Accordingly, second access controller 191 notifies first access controller 111 of first resource provider 110, of the request for the resource outside the execution environment by the application.

It should be noted that communication between connector 195 and first access controller 111 of first resource provider 110 is performed via the hypervisor that is fourth resource provider 140. This hypervisor can be said as a communication relay. In other words, integrated ECU 100 according to the present embodiment includes a communication relay that relays communication between application executor 190 and first access controller 111.

First resource provider 110 includes first access controller 111, environment identifier 112, environment authorization determiner 113, environment state determiner 114, resource state determiner 115, and first provision processor 116. It should be noted that second resource provider 120, third resource provider 130, fourth resource provider 140, and fifth resource provider 150 may each have the same functional configuration as first resource provider 110.

When first access controller 111 is notified of a request for a resource outside the execution environment by an application, environment identifier 112 identifies application executor 190 and the application that has requested the resource outside the execution environment. In the present embodiment, the number of application executor 190 included in integrated ECU 100 is one, but may be plural. For example, the request for the resource outside the execution environment includes identification information for each of the application and application executor 190. Environment identifier 112 extracts two pieces of identification information included in the request so as to identify the application and application executor 190. Then, environment identifier 112 outputs the two pieces of extracted identification information to environment authorization determiner 113.

Environment authorization determiner 113 determines whether each of the identified application and identified application executor 190 has the authority to use resources that are the resources outside the execution environment, i.e., whether they have the authority to use resources outside the environment. For example, environment authorization determiner 113 refers to a data table that indicates the identification information of each application in association with authority, and indicates the identification information of each application executor in association with authority. Then, environment authorization determiner 113 checks, in the data table, the authority associated with each of the two pieces of identification information output from application identifier 192. As a result of the check, it is determined whether the application and application executor 190 have authority.

Such environment authorization determiner 113 is an example of the authority determiner that determines whether an application or application executor 190 has authority to use resources.

Environment state determiner 114 determines whether application executor 190 identified by environment identifier 112 is anomalous. Specifically, environment state determiner 114 determines whether application executor 190 is under attack and is compromised, through communication with the outside via TCU 11. If application executor 190 is compromised, environment state determiner 114 determines that application executor 190 is anomalous. If application executor 190 is not compromised, environment state determiner 114 determines that application executor 190 is not anomalous.

For example, environment state determiner 114 may determine whether application executor 190 is compromised, by detecting behavior of application executor 190. Moreover, environment state determiner 114 may determine whether application executor 190 is compromised, by a pattern matching method. For example, if a pattern of application executor 190 matches a compromised pattern that has been registered in advance, environment state determiner 114 may determine that application executor 190 is compromised. Further, application executor 190 may defend even if it is attacked. In such a case, environment state determiner 114 may determine that application executor 190 is not compromised. For example, environment state determiner 114 monitors communication of application executor 190, and determines that application executor 190 is under attack when the communication is unexpected. Here, environment state determiner 114 determines that application executor 190 can defend against the attack, if application executor 190 under attack is not compromised based on the monitor of the behavior as described above.

Resource state determiner 115 determines whether the resource outside the execution environment, which has been requested by the application, can be provided. For example, resource state determiner 115 determines that the resource outside the execution environment can be provided, if the resource outside the execution environment is not in a conflict state and use of the resource outside the execution environment is not problematic for a current state of vehicle V. The case where the resource outside the execution environment is not in the conflict state is a case where components other than application executor 190 included in vehicle V do not use the resource outside the execution environment. Further, the case where the use of the resource outside the execution environment is not problematic for a current state of vehicle V is, for example, the resource outside the execution environment, which is the function of opening a trunk or door, is used when vehicle V is currently stopped, but not when vehicle V is currently running. Conversely, when vehicle V is currently running and the trunk or door is opened due to the use of the resource outside the execution environment, it is problematic for the state of vehicle V. Resource state determiner 115 refers to, for example, a data table that indicates each of a plurality of resources outside the execution environment and a state of vehicle V, which is necessary upon the resource outside the execution environment being used. Then, resource state determiner 115 searches for the state of vehicle V, which is associated, in the data table, with the resource outside the execution environment, which is requested by the application. Resource state determiner 115 specifies the current state of vehicle V. Then, if the specified current state of vehicle V is equal to the searched state of vehicle V, resource state determiner 115 determines that the use of the resource outside the execution environment is not problematic with the current state of vehicle V.

First provision processor 116 provides the resource outside the execution environment to be used for controlling vehicle V, according to the control of first access controller 111.

First access controller 111 determines whether the resource outside the execution environment can be provided from first provision processor 116 to an application, when first access controller 111 is notified of a request by the application for the resource outside the execution environment. In other words, when a request for the resource outside the execution environment is accepted from an application, and environment state determiner 114 determines that application executor 190 is anomalous, first access controller 111 prohibits first provision processor 116 from providing the resources outside the execution environment to the application. In the above-described case, when environment state determiner 114 determines that application executor 190 is not anomalous, first access controller 111 permits first provision processor 116 to provide the resource outside the execution environment to the application.

If application executor 190 has been attacked from the outside and compromised, for example, it is determined that application executor 190 is anomalous. Accordingly, provision of the resources outside the execution environment to the application of application executor 190 that has been compromised is prohibited. Therefore, vehicle V can be prevented from being inappropriately controlled by such an application using such a resource outside the execution environment. As a result, vehicle V can be appropriately controlled. Specifically, a vehicle database is provided to an application executed by application executor 190 that is compromised, thereby preventing vehicle V from traveling on an inappropriate route.

Further, first access controller 111 determines whether a resource outside the execution environment can be provided, according to a result of the determination regarding the authority by environment authorization determiner 113 and a result of the determination regarding a state of the resource outside the execution environment by resource state determiner 115.

Specifically, upon acceptance of a request for the resource outside the execution environment from the application, first access controller 111 permits the provision of a resource outside the execution environment from first provision processor 116 to an application program, when environment state determiner 114 determines that application executor 190 is not anomalous, and environment authorization determiner 114 determines that the application or application executor 190 has authority. This authority is the above-described authority for using the resource outside the environment.

Accordingly, if an application or application executor 190 does not have appropriate authority, provision of a resource to the application can be prohibited. As a result, it is possible to further prevent a malicious third party or the like from causing integrated ECU 100 to download an application program and to inappropriately control vehicle V.

In addition, upon acceptance of a request for the resource outside the execution environment from the application, first access controller 111 permits the provision of a resource outside the execution environment from first provision processor 116 to an application program, when environment state determiner 114 determines that application executor 190 is not anomalous, and resource state determiner 115 determines that the resource outside the execution environment is providable.

As a result, it is possible to prevent conflict in use of the resource outside the execution environment, for example, by permitting the provision of the resource outside the execution environment when the resource outside the execution environment is not providable. Alternatively, it is possible to prevent vehicle V from being controlled by an application using the resource outside the execution environment at inappropriate timing. For example, at a timing during vehicle V running, it is possible to prevent a trunk from being opened due to the application's control using the resource outside the execution environment.

It should be noted that, as described above, each of second resource provider 120, third resource provider 130, fourth resource provider 140, and fifth resource provider 150 may be provided with the same functional configuration as first resource provider 110. In this case, integrated ECU 100 includes a plurality of resource providers each including first access controller 111.

Figure 4:
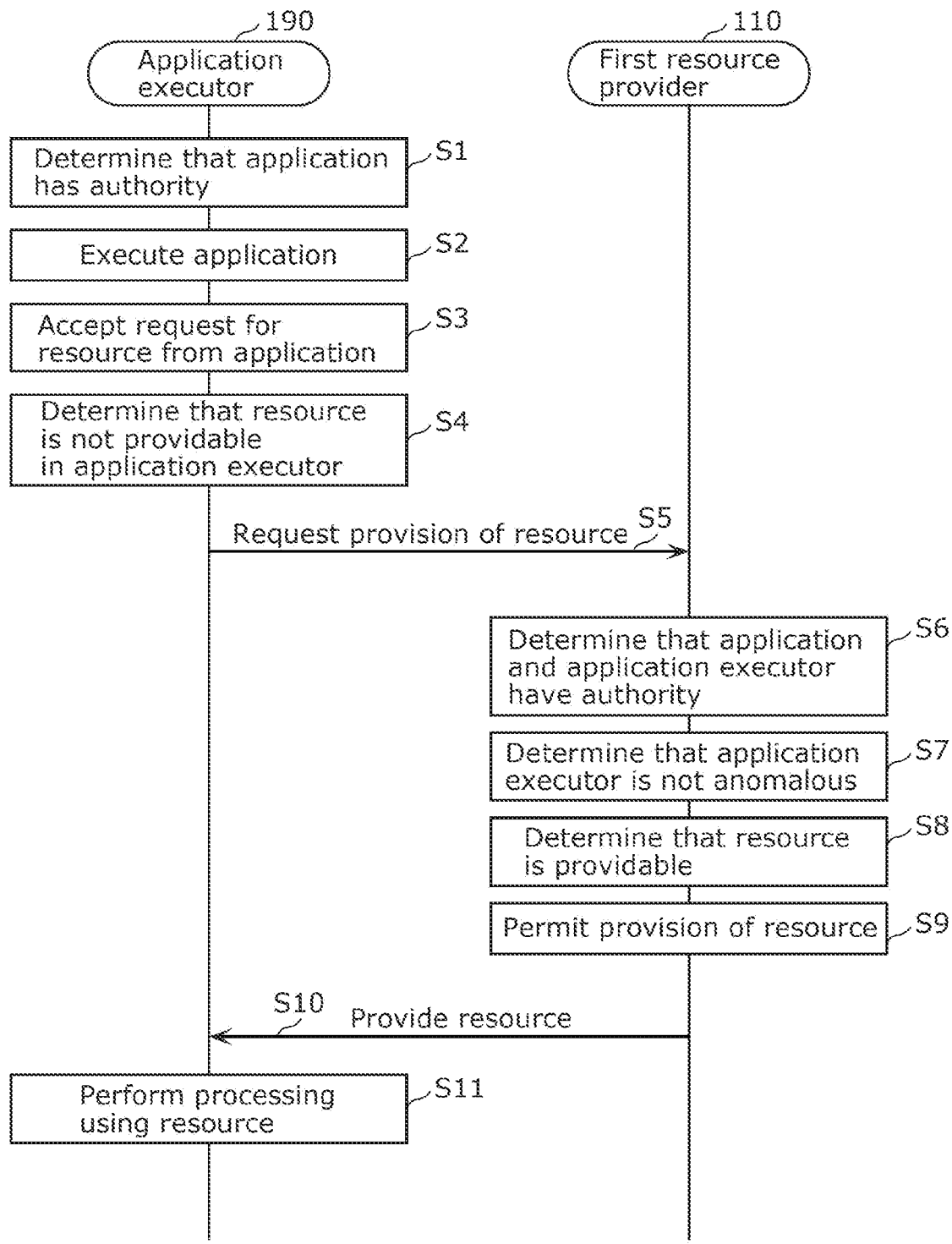
FIG. 4 is a sequence diagram showing a processing operation between the application executor and the first resource provider, according to the embodiment.

FIG. 4 is a sequence diagram showing processing operations between application executor 190 and first resource provider 110.

First, application authorization determiner 193 of application executor 190 determines that an application identified by application identifier 192 has execution authority (Step S1). Execution processor 196 then executes the application (Step S2).

Then, second access controller 191 accepts a request for a resource from the application (Step S3). Here, when determining that the requested resource cannot be provided in application executor 190 (Step S4), second access controller 191 notifies first resource provider 110 of the request for the resource through connector 195 (Step S5). Here, the requested resource is a resource outside the execution environment. In Step S5, second access controller 191 checks in advance that application authorization determiner 193 has determined that the application has authority to use the resource outside the execution environment, and then notifies first resource provider 110 of the request for the resource outside the execution environment.

When first access controller 111 is notified of the request for the resource outside the execution environment, environment identifier 112 of first resource provider 110 identifies an application that requests the resource and application executor 190. Then, environment authorization determiner 113 determines that the identified application and application executor 190 each have authority to use the resource outside the execution environment (Step S6).

Then, environment state determiner 114 determines that application executor 190 is not anomalous (Step S7), and resource state determiner 115 determines that the requested resource outside the execution environment can be provided (Step S8).

Next, first access controller 111 permits provision of the resource outside the execution environment to the application, according to results of the determination in Steps S6, S7 and S8 (Step S9). Then, first provision processor 116 provides the resource outside the execution environment to the application of application executor 190 in accordance with permission of the provision of the resource by first access controller 111 (Step S10). Then, the application performs processing using the provided resource outside the execution environment (Step S11). Thus, the application causes vehicle V to run, or open and close doors, a trunk, windows, or the like in vehicle V.

Figure 5:
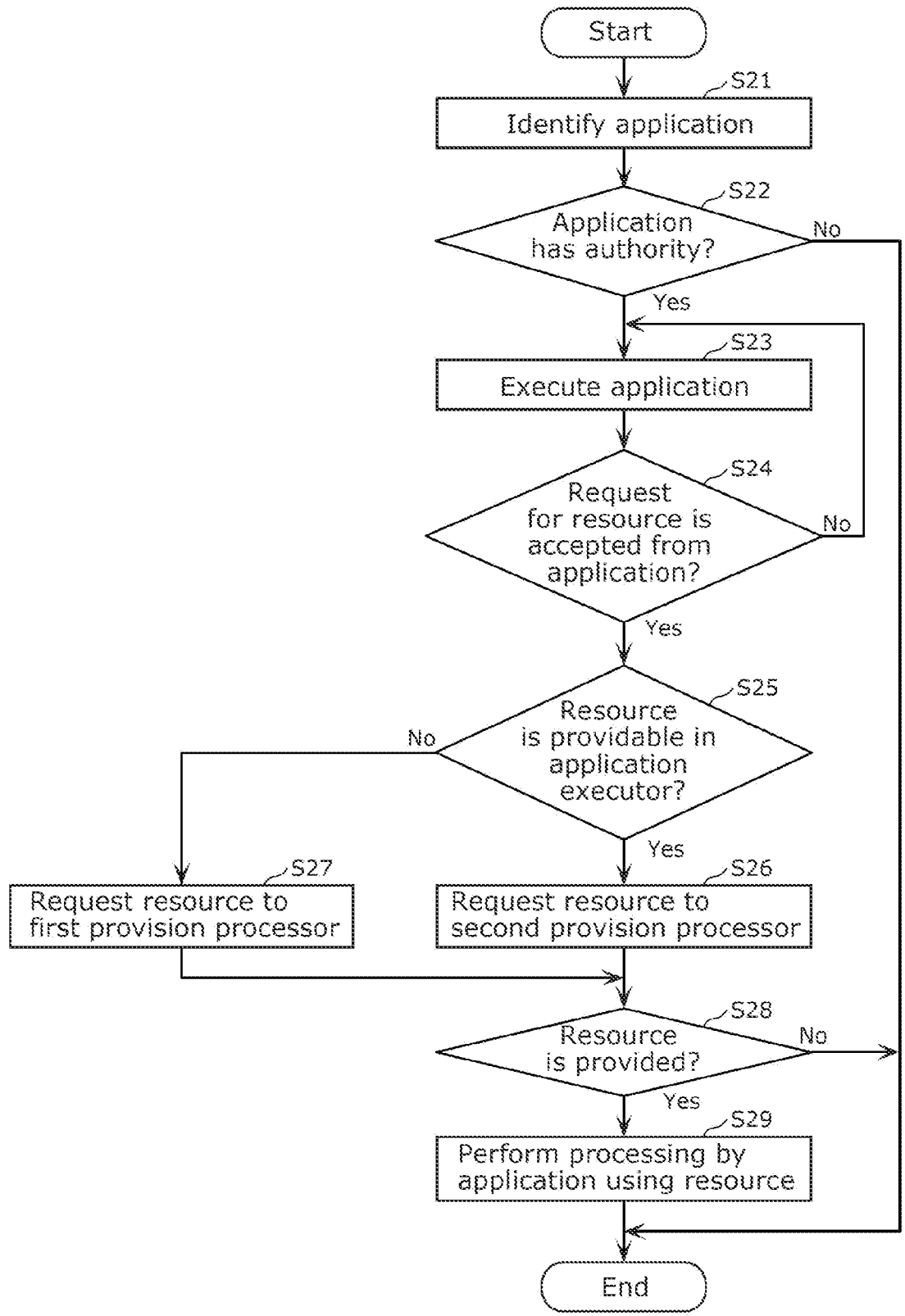
FIG. 5 is a flowchart showing a processing operation of the application executor according to the embodiment.

FIG. 5 is a flowchart showing processing operations of application executor 190.

First, application identifier 192 of application executor 190 identifies an application acquired in application executor 190 via TCU 11 (Step S21). Then, application authorization determiner 193 determines whether the identified application has authority (Step S22). The authority includes, for example, authority for execution, authority for using a resource inside the execution environment, and authority for using a resource outside the execution environment. Here, if it is determined that the application has authority (Yes in Step S22), execution processor 196 executes the application (Step S23).

Then, second access controller 191 determines whether a request for a resource has been accepted from the application (Step S24). If it is determined that the request for the resource has not been accepted (No in Step S24), execution processor 196 continues executing the application. On the other hand, if it is determined that the request for the resource has been accepted (Yes in Step S24), second access controller 191 determines whether the requested resource can be provided in application executor 190 (Step S25). That is, second access controller 191 determines whether the requested resource is a resource inside the execution environment or a resource outside the execution environment. Here, if it is determined that the resource can be provided in application executor 190 (Yes in Step S25), second access controller 191 notifies second provision processor 194 in application executor 190, of a request of the resource (Step S26). As a result, second provision processor 194 provides the application in execution processor 196 with the resource inside the execution environment, which is the requested resource.

On the other hand, if it is determined that the resource cannot be provided in application executor 190 (No in Step S25), second access controller 191 notifies first resource provider 110 of a request of the resource (Step S27). Accordingly, first resource provider 110 determines whether the requested resource, i.e., the resource outside the execution environment, can be provided. When the provision is permitted, first resource provider 110 provides the resource outside the execution environment to the application.

Then, second access controller 191 determines whether a resource inside the execution environment or a resource outside the environment has been provided (Step S28). Here, if it is determined that the provision of the resource has been accepted (Yes in Step S28), second access controller 191 causes execution processor 196 to perform processing by an application using the provided resource (Step S29).

If it is determined in Step S22 that the application does not have execution authority (No in Step S22), and it is determined in Step S28 that the provision or the resource has not been accepted (No in Step S28), application executor 190 terminates the processing related to the application.

FIG. 6 is a flowchart showing processing operations in first resource provider 110.

First, first access controller 111 of first resource provider 110 determines whether a request for a resource outside the execution is notified from an application (Step S41). Here, if it is determined that such request is not notified (No in Step S41), first access controller 111 repeats processing of Step S41. On the other hand, when first access controller 111 determines that the request has been notified (Yes in Step S41), environment identifier 112 identifies the application that has requested the resource outside the execution environment and application executor 190. Furthermore, environment authorization determiner 113 determines whether the identified application and identified application executor 190 have authority to use the resource outside the environment (Step S42).

Here, if it is determined that the application and application executor 190 have the authority to use the resource outside the execution environment (Yes in Step S42), environment state determiner 114 determines whether application executor 190 concerned is anomalous (Step S43). If it is determined that application executor 190 is not anomalous (No in Step S43), resource state determiner 115 determines whether the requested resource outside the execution environment can be provided (Step S44). If it is determined that the resource outside the execution environment is not providable (No in Step S44), first access controller 111 notifies application executor 190 of waiting, suspension, or busy (Step S45). On the other hand, if it is determined that the resource outside the execution environment is providable (Yes in Step S44), first access controller 111 causes first provision processor 116 to provide the resource outside the execution environment to the application in application executor 190 (Step S46).

Further, if environment authorization determiner 113 determines in Step 42 that at least one of the application and application executor 190 does not have the authority to use the resource outside the environment (No in Step S42), first resource provider 110 terminates processing related to provision of the resource. Further, if environment state determiner 114 determines in Step S43 that application executor 190 is anomalous (Yes in Step S43), first resource provider 110 also terminates the processing related to the provision of the resource. If environment authorization determiner 113 determines that at least one of the application and application executor 190 does not have the authority to use the resource outside the environment (No in step S42) in Step S42, first access controller 111 may notify application executor 190 of waiting, suspension, or busy, as in Step S45. In this case, first resource provider 110 repeats executing the processing of Step S42 until at least one of the application and application executor 190 has the authority to use the resource outside the environment.

[Effects and the Like]

As described above, in integrated ECU 100 according to the present embodiment, if it is determined that application executor 190, which is an execution environment for executing an application, is anomalous, provision of the resource from first resource provider 110 to the application is prohibited. For example, when application executor 190 was attacked from the outside so as to have been compromised, it is determined that application executor 190 is anomalous. Accordingly, provision of the resource to the application in such application executor 190 that has been compromised is prohibited, thereby preventing vehicle V from being inappropriately controlled by the application using the resource. As a result, vehicle V can be appropriately controlled.

In addition, second access controller 191 checks authority of the application. Then, according to a result of the check of the authority, second access controller 191 permits or prohibits a request for the resource by the application. Accordingly, when the application does not have the authority to use a resource for controlling vehicle V, a request for the resource by the application can be prohibited. As a result, it is possible to prevent a malicious third party who is not a car manufacturer, a car dealer, or a user of vehicle V from causing integrated ECU 100 to download the application, and from inappropriately controlling vehicle V.

Further, when a resource requested by the application is not providable in application executor 190, second access controller 191 notifies first access controller 111 of a request for the resource by the application. Further, when the resource is providable in application executor 190, second access controller 191 does not notify first access controller 111 of the request for the resource by the application. As a result, the request for the resource is notified to first access controller 111 only when the resource cannot be provided in application executor 190. Accordingly, it is possible to prevent first access controller 111 from being bothered of notification of the request for the resource even when the resource can be provided in application executor 190. As a result, useless notification of the requests for the resources can be reduced to reduce processing load.

Upon acceptance of a request for the resource, first access controller 111 permits provision of the resource to the application from first resource provider 110, when it is determined that application executor 190 is not anomalous, and determined that the application or application executor 190 has authority. Accordingly, if an application or application executor 190 does not have appropriate authority, the provision of the resource to such an application can be prohibited. As a result, it is possible to further prevent a malicious third party or the like from causing integrated ECU 100 to download an application program, and from inappropriately controlling vehicle V.

First access controller 111 may accept a request for a resource from an application. In such a situation, when it is determined that application executor 190 is not anomalous and the resource can be provided, first access controller 111 permits provision of the resource to the application from first resource provider 110. This allows the resource to be provided to the application, when the resource is in a providable state. Therefore, when the resource is not in the providable state, it is possible to prevent, for example, conflict in use of the resource by permitting the provision of the resource. Alternatively, it is possible to prevent vehicle V from being controlled at an inappropriate timing, by the application using the resource. For example, it is possible to prevent, while vehicle V is running, a trunk from being opened due to control by the application using the resource.

Furthermore, integrated ECU 100 includes first resource provider 110 to fifth resource provider 150 each including first access controller 111. This allows appropriate management of the provision of resources to applications, for each resource.

Variations

As described above, a vehicle control system such as an integrated ECU according to the present disclosure has been described based on the above embodiments, but the present disclosure is not limited to the embodiments. Various variations conceivable by those skilled in the art may be included in the present disclosure as long as they do not deviate from the spirit of the present disclosure.

For example, although first access controller 111 is included in first resource provider 110 in the above-described embodiment, first access controller 111 may be included in another component that configures integrated ECU 100. For example, first access controller 111 may be included in a component that is less likely to be attacked than application executor 190 among a plurality of components that configure integrated ECU 100. An external application may be downloaded to TCU 11, and the application may be installed in application executor 190 and executed, for example. Accordingly, a component closer to TCU 11 concerned or application executor 190 in terms of communication path is more likely to be attacked from the outside. Therefore, first access controller 111 may be included in a component far from TCU 11 or application executor 190 in terms of the communication path. For example, when third resource provider 130 communicates with application executor 190 via first resource provider 110 and second resource provider 120, first access controller 111 may be included in third resource provider 130. Further, fourth resource provider 140 or fifth resource provider 150 has stronger authority and a higher security level than first resource provider 110, second resource provider 120, and third resource provider 130. Therefore, first access controller 111 may be included in such fourth resource provider 140 or fifth resource provider 150. As a result, a possibility that first access controller 111 is attacked from the outside can be reduced, and the provision of resources to applications can be appropriately controlled.

Furthermore, although environment state determiner 114 may be included in first resource provider 110 in the above-described embodiment, environment state determiner 114 may be included in another component that constitutes integrated ECU 100. For example, environment state determiner 114 may be included in fourth resource provider 140 that is a hypervisor relaying communication between application executor 190 and first access controller 111. This hypervisor is also called a communication relay or a communication phase. The hypervisor has stronger authority and a higher security level than each virtual machine. Therefore, it is possible to reduce a possibility that environment state determiner 114 in the hypervisor is attacked from the outside, and to appropriately determine whether application executor 190 is anomalous.

Although first access controller 111 is included in each of first resource provider 110 to fifth resource provider 150 in the above-described embodiment, first access controller 111 common to those resource providers may be included in fifth resource provider 150. In this case, each of first resource provider 110 to fourth resource provider 140 is not provided with first access controller 111, and first resource provider 110 to fourth resource provider 140 communicate with common first access controller 111 included in fifth resource provider 150. As a result, security for first access controller 111 can be improved, since fifth resource provider 150 is a secure monitor.

Although environment state determiner 114 determines whether application executor 190 is anomalous in the above-described embodiment, environment state determiner 114 may perform determination not only for application executor 190 but also for second resource provider 120 to fifth resource provider 150 as to whether at least one of them is anomalous. For example, although it is determined that application executor 190 is not anomalous, it may be determined that at least one of second resource provider 120 to fifth resource provider 150 is anomalous. In such a case, first access controller 111 may prohibit provision of resources. In addition, instead of determining whether each of application executor 190 and second resource provider 120 to fifth resource provider 150 is anomalous, environment state determiner 114 may specify the degree of compromise as a numerical value. For example, first access controller 111 may prohibit the provision of a resource when an integrated value of the degree of compromise of each of application executor 190 and second resource provider 120 to fifth resource provider 150 is greater than or equal to a threshold value.

Furthermore, first access controller 111 permits or prohibits the provision of resources based on results of the determination of environment authority determiner 113, environment state determiner 114, and resource state determiner 115, in the above-described embodiment. However, first access controller 111 may also permit or prohibit the provision of resources based on settings by a user for vehicle V as well. For example, a vehicle database that is the resource may contain user personal information. The user sets, in onboard system 10, setting information indicating whether the personal information can be used by an application. Then, first access controller 111 reads out the setting information, and prohibits the provision of resources if the setting information indicates that use of the personal information is not permitted, for example, regardless of the results of the determination of environment authority determiner 113 and the like. Alternatively, first access controller 111 may inquire of the user as to whether the provision of personal information is permitted. In this case, when receiving a reply indicating, for example, that use of the personal information is not permitted, as a reply to the inquiry to the user, first access controller 111 also prohibits the provision of resources, regardless of the results of the determination of environment authority determiner 113 and the like.

Furthermore, when resource state determiner 115 determines that a resource is in a conflict state, first access controller 111 notifies the application of standby or busy, in the above-described embodiment. However, if priority of another application competing for the resource is lower than priority of an application in application executor 190, first access controller 111 may permit provision of the resource to the application of application executor 190. In this case, first access controller 111 may acquire the priority from each of the competing application and the application in application executor 190 and compare the priorities. In addition, first access controller 111 may refer to a data table that indicates the priority of each of a plurality of applications. First access controller 111 refers to the data table to acquire the priority of each of the competing application and the application of application executor 190, and compares the priorities.

Furthermore, application executor 190 in the above-described embodiment may be an execution environment dedicated to a third-party application. In this case, integrated ECU 100 may further include an application executor that is an execution environment dedicated to a native application. Such an application executor is hereinafter referred to as a native application executor. The native application is a genuine application from a car manufacturer or a car dealer of vehicle V. The native application executor may cooperate with first access controller 111 and may receive requests from second access controller 191.

Furthermore, each of application executor 190, first resource provider 110, second resource provider 120, and third resource provider 130 is a virtual machine in the above-described embodiment, but may be a physical machine. In this case, the physical machine may be a CPU. In this case, integrated ECU 100 includes a plurality of CPUs respectively corresponding to application executor 190, first resource provider 110, second resource provider 120, and third resource provider 130. Furthermore, the physical machine may be a core included in the CPU. In this case, the CPU has a plurality of cores respectively corresponding to first resource provider 110, second resource provider 120, and third resource provider 130.

Furthermore, first access controller 111 permits or prohibits the provision of resources based on results of the determination made by environment authority determiner 113, environment state determiner 114, and resource state determiner 115, in the above embodiment. Here, first access controller 111 may permit or prohibit the provision of a resource based on a result of the determination made by at least one of environment authority determiner 113, environment state determiner 114, and resource state determiner 115. Furthermore, environment authorization determiner 113 determines authority of each of the application and application executor 190 in the above-described embodiment, but may determine the authority of at least one of the application and application executor 190.

In at least one embodiment described above, each component may be embodied by dedicated hardware or by executing a software program suitable for each component. Each component may be embodied by a program executor such as a central processing unit (CPU) or processor reading and executing a software program recorded in a recording medium such as a hard disk or a semiconductor memory. Here, a software that embodies an image decoding device and the like of each of the above embodiments has a following program.

Specifically, this program causes a computer to execute each step of the flowcharts shown in FIGS. 5 and 6, respectively.

It should be noted that the following cases are also included in the present disclosure.

(1) At least one of the above-described devices is specifically a computer system including a microprocessor, a read only memory (ROM), a random access memory (RAM), a hard disk unit, a display unit, a keyboard, a mouse, and the like. A computer program is stored in the RAM or the hard disk unit. The microprocessor operates according to the computer program, thereby allowing at least one of the above-described devices to carry out its functions. Here, the computer program is produced by combining a plurality of instruction codes indicating instructions to the computer, in order to carry out a predetermined function.

(2) A part or all of components constituting the above-described at least one device may be composed of one system large scale integration (LSI) chip. The system LSI chip is a super multifunctional LSI chip manufactured by integrating multiple components on a single chip. Specifically, the system LSI chip is a computer system that includes a microprocessor, ROM, RAM, etc. A computer program is stored in the RAM. The microprocessor operates according to the computer program, thereby allowing the system LSI chip to carry out its functions.

(3) A part or all of the components constituting the above-described at least one device may be composed of an integrated circuit (IC) card or a single module, which can be attached to and detached from the device. The IC card or the module is a computer system that includes a microprocessor, ROM, RAM, and the like. The IC card or the module may include the super multifunctional LSI described above. The microprocessor operates according to the computer program, thereby allowing the IC card or the module to carry out its function. This IC card or this module may be tamper resistant.

(4) The present disclosure may be the methods described above. Furthermore, the present disclosure may be a computer program for embodying these methods by a computer, or may be a digital signal composed of a computer program.

In addition, the present disclosure may be a computer-readable recording medium such as a flexible disc, a hard disk, a compact disc (CD)-ROM, a DVD, a DVD-ROM, a DVD-RAM, a Blu-ray (registered trademark) disc (BD), a semiconductor memory, or the like, in which a computer program or a digital signal is recorded. Alternatively, the present disclosure may be a digital signal recorded on these recording media.

Further, the present disclosure may transmit a computer program or a digital signal via a telecommunication line, a wireless or a wired communication line, a network typified by the Internet, data broadcasting, and the like.

Also, a program or a digital signal may be recorded on a recording medium and transferred, or the program or the digital signal may be transferred via a network or the like, to be thereby embodied by another independent computer system.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2021-021005 filed on Feb. 12, 2021, and PCT International Application No. PCT/JP2021/045967 filed on Dec. 14, 2021.

INDUSTRIAL APPLICABILITY

A vehicle control system according to the present disclosure can be applied to, for example, an integrated ECU mounted on a vehicle.

The invention claimed is:

1. A vehicle control system provided in a vehicle, the vehicle control system comprising:
    circuitry; and
    at least one memory connected to the circuitry, wherein
    using the at least one memory, the circuitry performs operations, the operations including:
        receiving a request, from an application program, for a resource that is used for controlling the vehicle;
        determining whether an application executor that executes the application program is anomalous;
        determining whether the resource is in a providable state;
        upon receipt of the request for the resource from the application program; prohibiting provision of the resource to the application program, when the application executor is determined to be anomalous; and permitting the provision of the resource to the application program, when the application executor is determined to not be anomalous; and
        providing the resource to the application program, when the provision of the resource is permitted, wherein
    the operations determine the prohibiting or the permitting of the provision of the resource to the application program according to an identification result of the application program and executing the application program for which the resource is requested, a first determination result of whether the executing of the application is anomalous, and a second determination result of whether the resource is in the providable state.

2. The vehicle control system according to claim 1, wherein
    the operations check an authority of the application program, and according to a result of the check of the authority, the request for the resource from the application program is permitted, held, or prohibited.

3. The vehicle control system according to claim 2, wherein
    the circuitry: determines the prohibiting or the permitting of the provision of the resource to the application program from outside the application executor, when the resource requested by the application program is not providable in the application executor; and does not determine the prohibiting or the permitting of the provision of the resource to the application program from outside the application executor, when the resource requested by the application program is providable in the application executor.

4. The vehicle control system according to claim 1, wherein
    the circuitry further determines whether the application program or the application executor has authority to use the resource, and
    upon the receipt of the request for the resource from the application program, the provision of the resource to the application program is permitted, when the circuitry determines that the application executor is not anomalous and that one of the application program or the application executor has the authority.

5. The vehicle control system according to claim 1, wherein
upon the receipt of the request for the resource from the application program, the provision of the resource to the application program is permitted, when the circuitry determines that the application executor is not anomalous and that the resource is in the providable state.

6. The vehicle control system according to claim 1, wherein
the resource is at least one of information, a function, or a hardware resource to be used for controlling the vehicle.

7. A vehicle control method performed by a computer provided in a vehicle, the vehicle control method comprising:
receiving a request, from an application program, for a resource that is used for controlling the vehicle;
determining whether an application executor that executes the application program is anomalous;
determining whether the resource is in a providable state;
upon receipt of the request for the resource from the application program; prohibiting provision of the resource to the application program, when the application executor is determined to be anomalous; and permitting the provision of the resource to the application program, when the application executor is determined not to be anomalous; and
providing the resource to the application program, when the provision of the resource is permitted, wherein
the vehicle control method determines the prohibiting or the permitting of the provision of the resource to the application program according to an identification result of the application program and executing the application program for which the resource is requested, a first determination result of whether the executing the application program is anomalous, and a second determination result of whether the resource is in the providable state.

8. A vehicle control system provided in a vehicle, the vehicle control system comprising:
a first processor; and
a memory including a program that, when executed by the first processor, causes the first processor to perform operations, the operations including:
receiving a request, from an application program, for a resource that is used for controlling the vehicle;
determining whether a second processor that executes the application program is anomalous;
determining whether the resource is in a providable state;
upon receipt of the request for the resource from the application program: prohibiting provision of the resource to the application program, when the second processor is determined to be anomalous; and permitting the provision of the resource to the application program, when the second processor is determined to not be anomalous; and
providing the resource to the application program, when the provision of the resource is permitted, wherein
the operations determine the prohibiting or the permitting of the provision of the resource to the application program according to an identification result of the application program and executing the application program for which the resource is requested, a first determination result of whether executing the application program is anomalous, and a second determination result of whether the resource is in the providable state.

* * * * *